United States Patent
Page et al.

(10) Patent No.: US 11,565,630 B1
(45) Date of Patent: *Jan. 31, 2023

(54) SEAT CARRIER FOR LONG GUNS

(71) Applicant: Nivel Parts & Manufacturing Co., LLC, Jacksonville, FL (US)

(72) Inventors: Robert Neal Page, Raleigh, NC (US); Charles Dunn Kim, Cary, NC (US); Jihoon Kim, Cary, NC (US)

(73) Assignee: NIVEL PARTS & MANUFACTURING CO., LLC, Jacksonville, FL (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/225,262

(22) Filed: Apr. 8, 2021

Related U.S. Application Data

(63) Continuation of application No. 16/399,182, filed on Apr. 30, 2019, now Pat. No. 10,981,515.

(60) Provisional application No. 62/666,954, filed on May 4, 2018.

(51) Int. Cl.
  *B60R 7/14* (2006.01)
  *F41C 33/04* (2006.01)
  *F41C 33/06* (2006.01)

(52) U.S. Cl.
  CPC ............... *B60R 7/14* (2013.01); *F41C 33/06* (2013.01)

(58) Field of Classification Search
  CPC .................... B60R 7/14; F41C 33/06
  USPC ................................... 224/275, 931
  See application file for complete search history.

(56) References Cited

U.S. PATENT DOCUMENTS

| | | | | |
|---|---|---|---|---|
| 2,692,069 A | * | 10/1954 | Winters | A47B 81/005 211/64 |
| 2,775,351 A | * | 12/1956 | Johnson | B60R 7/14 211/64 |
| 2,971,572 A | * | 2/1961 | Watkins | A45C 9/00 297/411.24 |
| 3,361,265 A | * | 1/1968 | Wernimont | A47B 81/005 248/176.1 |
| 3,473,673 A | * | 10/1969 | Porter | A47B 81/005 211/64 |
| 3,477,586 A | * | 11/1969 | Haluska | A47B 81/005 224/571 |
| 3,497,077 A | * | 2/1970 | Sjostrand | B60R 7/14 211/64 |
| 3,501,074 A | * | 3/1970 | Emerick | F41C 33/007 224/606 |
| 3,619,825 A | * | 11/1971 | Taub et al. | A47D 7/002 5/944 |
| 3,706,403 A | | 12/1972 | Sikes | |
| 3,767,094 A | * | 10/1973 | Sikes | B60R 7/14 248/346.03 |
| 3,942,691 A | | 3/1976 | Sisak | |

(Continued)

*Primary Examiner* — Nathan J Newhouse
*Assistant Examiner* — Lester L Vanterpool
(74) *Attorney, Agent, or Firm* — Coats & Bennett, PLLC

(57) ABSTRACT

A long gun carrier rests on a vehicle seat, and is secured to the seat by a seat belt. A slated top of the long gun carrier slopes generally downward and forward. One or more gun-holding channels formed in slanted top, each configured to hold a long gun pointed generally forward and downward, toward the vehicle floor. The long guns may be secured in the gun-holding channels by strap assemblies. Long guns are conveniently placed into and extracted from the long gun carrier, held securely during transportation, and pointed in a safe direction during transport.

19 Claims, 16 Drawing Sheets

(56) References Cited

U.S. PATENT DOCUMENTS

| | | | |
|---|---|---|---|
| 4,131,202 A * | 12/1978 | Hansen | F41A 23/18 211/2 |
| 4,260,091 A | 4/1981 | French et al. | |
| 4,364,499 A * | 12/1982 | McCue | B60R 7/14 211/64 |
| 4,579,263 A * | 4/1986 | Ehmke | B60R 7/14 224/570 |
| 4,922,642 A | 5/1990 | Ohlhauser | |
| 5,129,563 A | 7/1992 | Dillon | |
| 5,443,191 A * | 8/1995 | Jorgenson | B60R 7/14 224/543 |
| 5,479,892 A * | 1/1996 | Edwards | B60R 21/02 297/250.1 |
| 5,495,969 A * | 3/1996 | Cardenas | B60R 7/14 211/195 |
| 5,542,589 A * | 8/1996 | McKee | B60R 7/043 455/344 |
| 5,551,373 A * | 9/1996 | O'Donnell | A01K 1/0272 297/487 |
| 5,551,616 A * | 9/1996 | Stitt | B60R 7/043 224/539 |
| 5,683,021 A | 11/1997 | Setina | |
| 5,799,850 A * | 9/1998 | Ryder | B60R 7/14 224/539 |
| D401,213 S * | 11/1998 | Inchaurregui | D12/406 |
| 5,833,102 A * | 11/1998 | Jacobson | B60R 7/14 224/539 |
| 5,996,865 A | 12/1999 | Bissey | |
| 6,206,261 B1 * | 3/2001 | McCrary | B60R 7/14 206/315.11 |
| 6,293,447 B1 * | 9/2001 | Jorgensen | B60R 7/14 224/571 |
| 6,405,909 B1 | 6/2002 | Burnett et al. | |
| 6,422,440 B1 * | 7/2002 | Stone | B60R 7/043 D12/426 |
| 6,443,346 B1 | 9/2002 | Haass | |
| 6,450,378 B1 | 9/2002 | Miller | |
| 6,588,365 B2 * | 7/2003 | Best Wright | A01K 1/0272 119/28.5 |
| 6,626,338 B1 * | 9/2003 | Rhodes, Jr. | B60R 11/02 296/37.1 |
| 6,766,927 B1 * | 7/2004 | Cart | B60R 7/14 224/571 |
| 6,986,446 B2 * | 1/2006 | Murray | F41A 23/18 211/64 |
| 8,444,034 B2 * | 5/2013 | Bennett | B60R 7/14 224/544 |
| 8,887,973 B2 | 11/2014 | DeVolder | |
| D775,859 S * | 1/2017 | DeHart | D6/552 |
| 9,758,105 B2 * | 9/2017 | Ledoux | B60R 7/14 |
| 9,987,993 B2 * | 6/2018 | Thorimbert | F41A 23/18 |
| 2002/0070137 A1 * | 6/2002 | Hedges | E06C 7/14 206/373 |
| 2017/0361776 A1 * | 12/2017 | Thorimbert | F41A 23/18 |

* cited by examiner

SEAT CARRIER FOR LONG GUNS

This application is a continuation of U.S. application Ser. No. 16/399,182, filed 30 Apr. 2019, which claims the benefit U.S. Provisional Application No. 62/666,954, filed 4 May 2018, the disclosures of both of which are incorporated by reference herein in their entirety.

FIELD OF INVENTION

The present invention relates generally to vehicle gun racks, and in particular to a long gun carrier having bottom and back surfaces and adapted to be secured to a vehicle seat by a seat belt.

BACKGROUND

Long guns are a subset of the small arms category of firearms. Long guns are generally characterized by long barrels, a forearm or front grip, and a shoulder stock. They are designed and intended to be fired from the shoulder, using two hands. Examples of long guns include rifles, carbines, and shotguns. Actions may include semiautomatic, lever-action, bolt action, pump, and single-shot (either breech- or muzzle-loading). Long guns are distinguished from other small arms, such as handguns and personal defense weapons comprising medium length barrels and pistol-type grips not designed to be fired from the shoulder.

While handguns may be safely and securely transported while worn in a holster or placed in a glove compartment or console of a vehicle, the safe transportation of long guns is more problematic. Long guns are bulky in the confined space of a vehicle interior or on a small vehicle such as an All-Terrain Vehicle (ATV) or Utility Vehicle (UTV). To protect the long gun from damage, and to prevent misalignment of optics or other sights, the long gun should be secured in a case or rack, rather than being free to slide around in the floor, trunk, or cargo bed of a vehicle. Repeatedly moving a long gun to and from a case, such as when traveling field-to-field while hunting, is inconvenient and time-consuming.

A variety of gun racks and holders are known in the art. However, many of them are not readily accessible, and are as inconvenient to use as a case. While not the best practice from a safety perspective, the fact is that many hunters travel at least short distances with long guns still loaded, and many prior art gun racks store the long guns with their barrels pointed in potentially unsafe directions. Additionally, many prior art gun racks are effectively little more than hooks, which may not hold a long gun securely as the vehicle travels over rough terrain, or in the event of an accident. Some prior art gun racks require quasi-permanent installation in a vehicle, and cannot readily be moved between vehicles in the field. Some prior art gun racks, such as the iconic pickup truck rear window rack, prominently expose long guns to exterior view, inviting theft.

A need exists in the art for a long gun holder that is convenient and readily accessible, that securely holds one or more long guns pointed in a safe direction, and that protects the long gun and its sights in transit. Furthermore, a need exists for such a long gun holder that is simple to install and remove, and that is relatively inconspicuous in use.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and/or claimed herein, a long gun carrier rests on a vehicle seat, and is secured to the seat by a seat belt. An upper, sloping surface of the long gun carrier slopes generally downward and forward. One or more gun-holding channels formed in this sloping surface each hold a long gun pointed generally forward and downward, toward the vehicle floor. The long guns may be secured in the gun-holding channels by straps. Long guns are conveniently placed into and extracted from the long gun carrier, held securely during transportation, pointed in a safe direction, and not readily visible from the exterior.

One embodiment relates to a long gun carrier for a vehicle seat that includes a seat portion and a back portion. The long gun carrier includes a body. The body has a longitudinal axis, and includes a generally flat, horizontal bottom surface adapted to rest on part of the seat portion of the vehicle seat. The body has a generally flat, vertical back surface adapted to contact part of the back portion of the vehicle seat. The long gun carrier body includes one or more gun-holding channels, each parallel with the longitudinal axis and adapted to removably contain a long gun. The body additionally includes a through channel transverse to the longitudinal axis and below the one or more gun-holding channels. The through channel is adapted to accept a seat belt operative to secure the carrier to the vehicle seat.

In some aspects, the present disclosure relates to a long gun carrier for a vehicle seat that includes a seat portion and a back portion. The long gun carrier comprises a bottom adapted to rest on part of the seat portion of the vehicle seat; a back adapted to contact part of the back portion of the vehicle seat; and a longitudinal axis extending transverse to the bottom and the back. The long gun carrier further comprises a slanted top extending parallel to the longitudinal axis, with the top having first and second gun-holding channels. Each gun-holding channel is disposed parallel to the longitudinal axis and adapted to removably contain a long gun. At least the first gun-holding channel comprises a forward portion adapted to cradle an action of the long gun and an aft section adapted to cradle a stock of the long gun. A gap is disposed longitudinally between the forward section and the aft section, and the gap is adapted to expose a portion of the long gun between the action and the stock. The carrier further includes a first through-channel transverse to the longitudinal axis and disposed below the first and second gun-holding channels. The first through-channel is adapted to accept a seat belt operative to secure the carrier to the vehicle seat such that the bottom is secured against the seat portion of the vehicle seat and the back is secured against the back portion of the vehicle seat. The carrier also includes a second through-channel disposed transverse to the longitudinal axis and below the first and second gun-holding channels and aligned with the gap. The second through-channel has a spur passage disposed between the first and second gun-holding channels and opening to the gap. The carrier also includes a magazine recess that is open to the first gun-holding channel, extends downwardly, and is laterally closed. The magazine recess is disposed below the first gun-holding channel and closer to a front of the carrier than both the first and second through channels. In use, a seat belt inserted through the first through-channel secures the long gun carrier such that the bottom is secured against the seat portion of the vehicle seat and the back is secured against the back portion of the vehicle seat. The carrier also includes a strap assembly comprising a strap and an associated fastener. The strap assembly is selectively closable into a loop via the fastener to secure the long gun within the first gun-holding channel with the strap assembly extending through the second through passage, including the spur passage, and across the first gun-holding channel at the gap.

Another embodiment relates to a method of transporting long guns in a vehicle having a seat that includes a seat portion and a back portion. A long gun carrier is provided. The long gun carrier comprises a body including a longitudinal axis, a generally flat, horizontal bottom surface, a generally flat, vertical back surface, one or more gun-holding channels parallel with the longitudinal axis, and a through-channel transverse to the longitudinal axis and below the one or more gun-holding channels. The long gun carrier is placed in the seat of a vehicle such that the bottom surface rests on part of the seat portion of the vehicle seat and the back surface contacts part of the back portion of the vehicle seat. A seat belt of the vehicle is placed through the through channel and tightened so as to hold the long gun carrier securely against the vehicle seat. A long gun is placed in a gun-holding channel of the long gun carrier.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
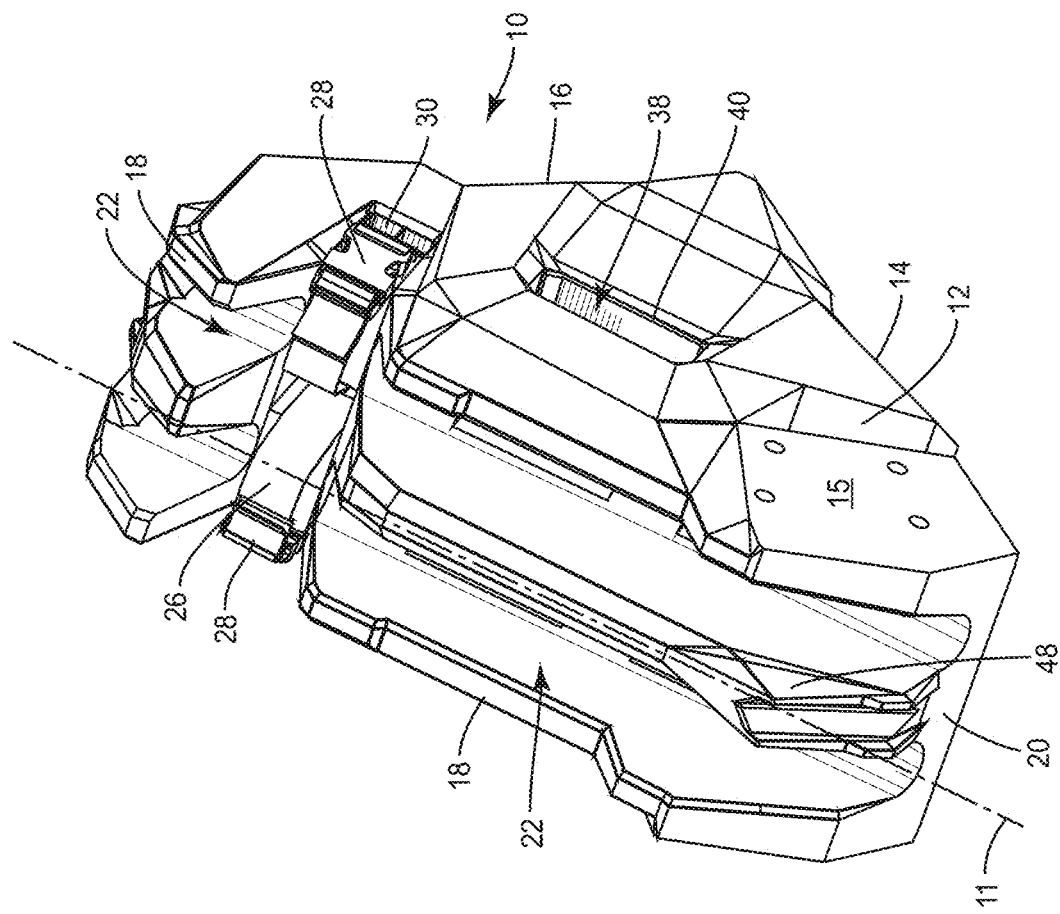
FIG. 1 is a perspective view of the front and side of a long gun carrier.
Figure 2:
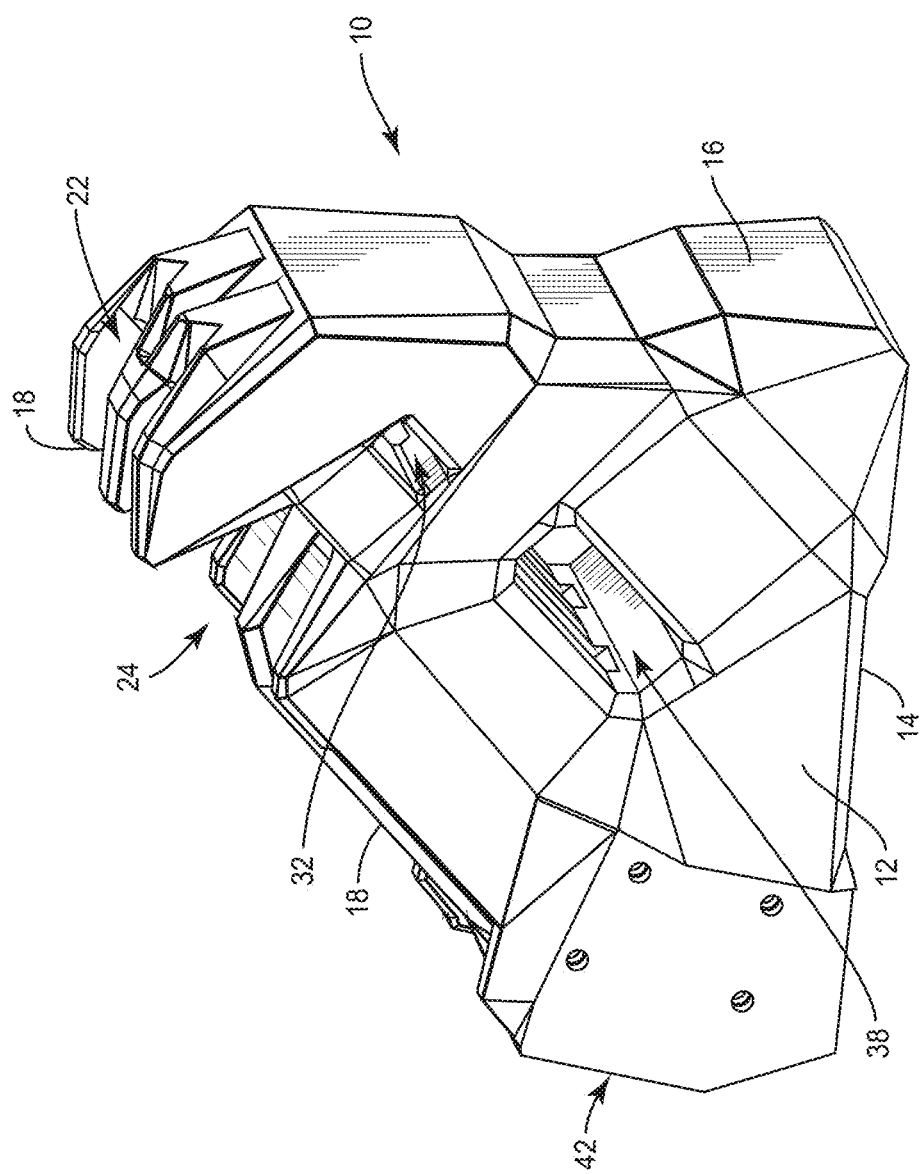
FIG. 2 is a perspective view of the back and side of the long gun carrier.
Figure 3:
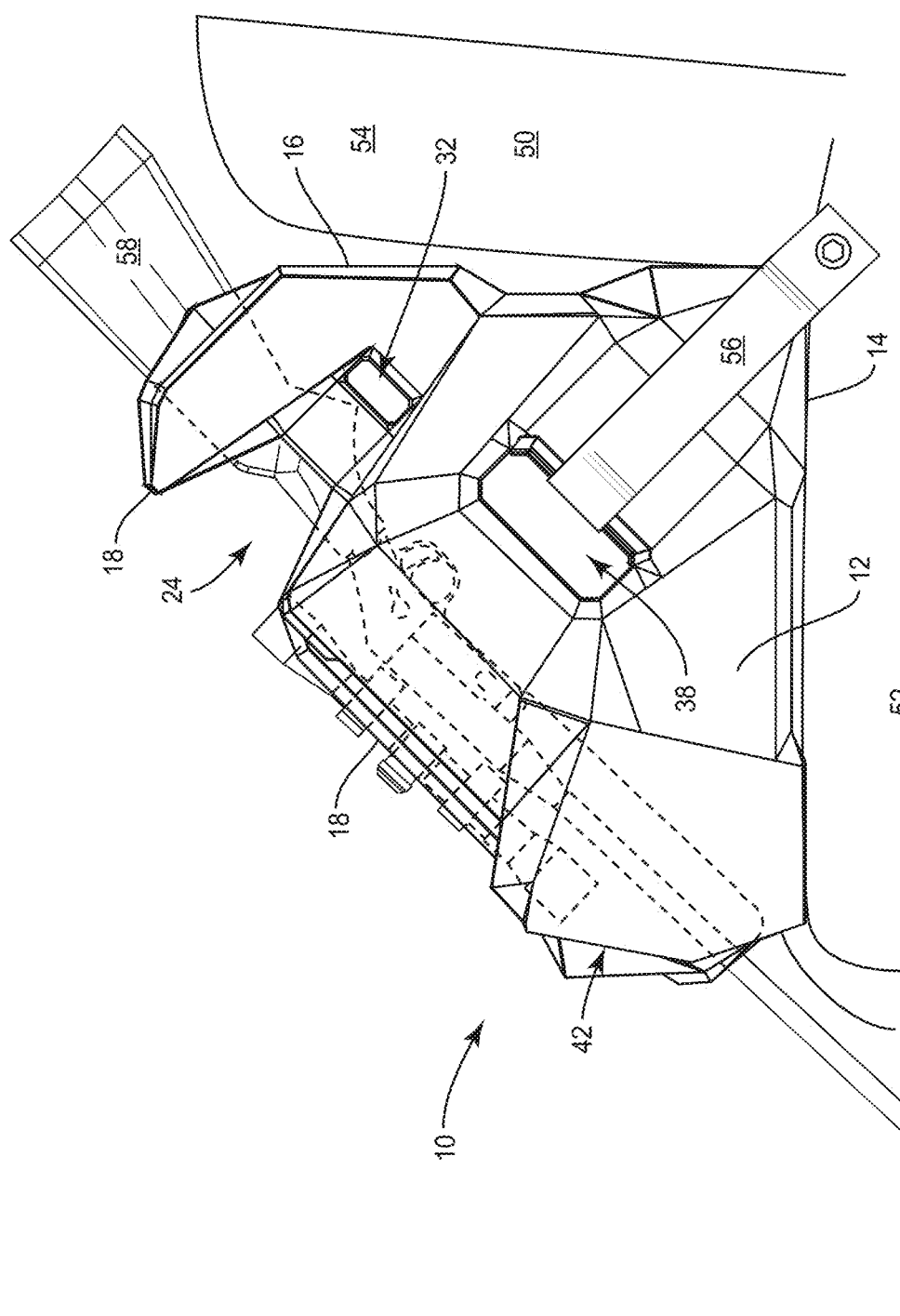
FIG. 3 is a side view of the long gun carrier installed on a vehicle seat.

FIGS. 1 and 2 are perspective views of a long gun carrier 10 for a vehicle, and FIG. 3 is a side view showing the carrier 10 mounted on a vehicle seat 50 (and holding a long gun 58). The long gun carrier 10 is adapted to be secured on the vehicle seat 50 (or console between seats) by a seat belt 56 of the vehicle, in a manner similar to securing an infant or child safety seat in the vehicle.

The long gun carrier 10 comprises a body 12, having a longitudinal axis 11, shown in FIG. 1 as lying along a sloping surface 18. The body 12 has a generally flat, horizontal bottom surface 14 adapted to contact part of the seat portion 52 of the vehicle seat 50, and a generally flat, vertical back surface 16 adapted to contact part of the back portion 54 of the vehicle seat 50. A sloping surface 18 extends from the upper back surface 16 generally toward the front of the bottom surface 14. In the embodiment depicted in the Figures, the sloping surface 18 slopes from the upper back surface 16 toward a point forward of the front of the bottom surface 16, and a generally flat, vertical front surface 20 extends between the front of the bottom surface 14 and a forward extent of the sloping surface 18.

One or more gun-holding channels 22 are formed in the sloping surface 18, parallel to the longitudinal axis 11. The Figures depict two such gun-holding channels 22, straddling the longitudinal axis 11. The formation of gun-holding channels 22 in the sloped surface 18, in some embodiments, forms the sloping surface 18 into a series of longitudinal ridges between and outward of the gun-holding channels 22. As depicted in FIG. 3, each gun-holding channel 22 is operative to removably contain a long gun 58, with a muzzle 60 of the long gun 58 pointed generally toward a floor of the vehicle forward of the vehicle seat portion 52. The dimensions and angles of the body 12 of the long gun carrier 10—in particular, the length of the bottom surface 14, the slope of the sloping surface 18, and the height of the front surface 20—are such that the gun-holding channels 22 are operative to hold a long gun 58 such that no part of the long gun, such as, e.g., the muzzle 60, contacts the seat portion 52 of the vehicle seat 50, when the long gun carrier 10 is secured to the vehicle seat 50 by the seat belt 56. In some embodiments, a deformable material, such as closed-cell foam, lines part or all of a gun-holding channel 22.

In one embodiment, a cut-out 24 in the sloping surface 18 is positioned aft of the action of a long gun 58 and generally coincides with the location of a pistol grip. The cut-out 24 facilitates removal of the long gun 58 from the gun-holding channel 22, by providing access to a portion of the long gun 58 normally grasped when carrying the long gun 58. The cut-out 24 additionally facilitates access, in some embodiments, to a strap 26 and fastener 28.

As shown in FIG. 1, a securing strap 26 with a side-release buckle 28 is provided for each gun-holding channel to secure the long gun in the gun-holding channel 22. The side-release buckle 28 includes male and female connectors attached to opposite ends of the strap 26 and provides means to adjust the operative length of the strap 26 to accommodate guns of different size. In one embodiment, the strap 26 is formed of a material having elasticity in at least its longitudinal dimension. In this embodiment, the strap 26 may be adjusted to exert a positive downward force on the long gun 58, further securing it in the gun-holding channel 22.

In the exemplary embodiments, the body of the long gun carrier 10 is provided with a through-channel 32 and associated spur passage or strap access well 34 to enable the securing straps 26 to wrap around the gun-holding channels 22. The through-channel 32 extends through the body of the long gun carrier 10 beneath the gun-carrying channels 22 in a direction transverse to the longitudinal axis 11. The spur passage or access well 34 extends perpendicular to the main through-channel 32 between the gun-holding channels 22 and intersects the channel 32. The securing strap 26 for each gun-holding channel 22 extends through the channel 32 with one end of the strap 26 exiting via the strap access well 34 and the other end exiting the channel opening on one side of the body.

Figure 4:
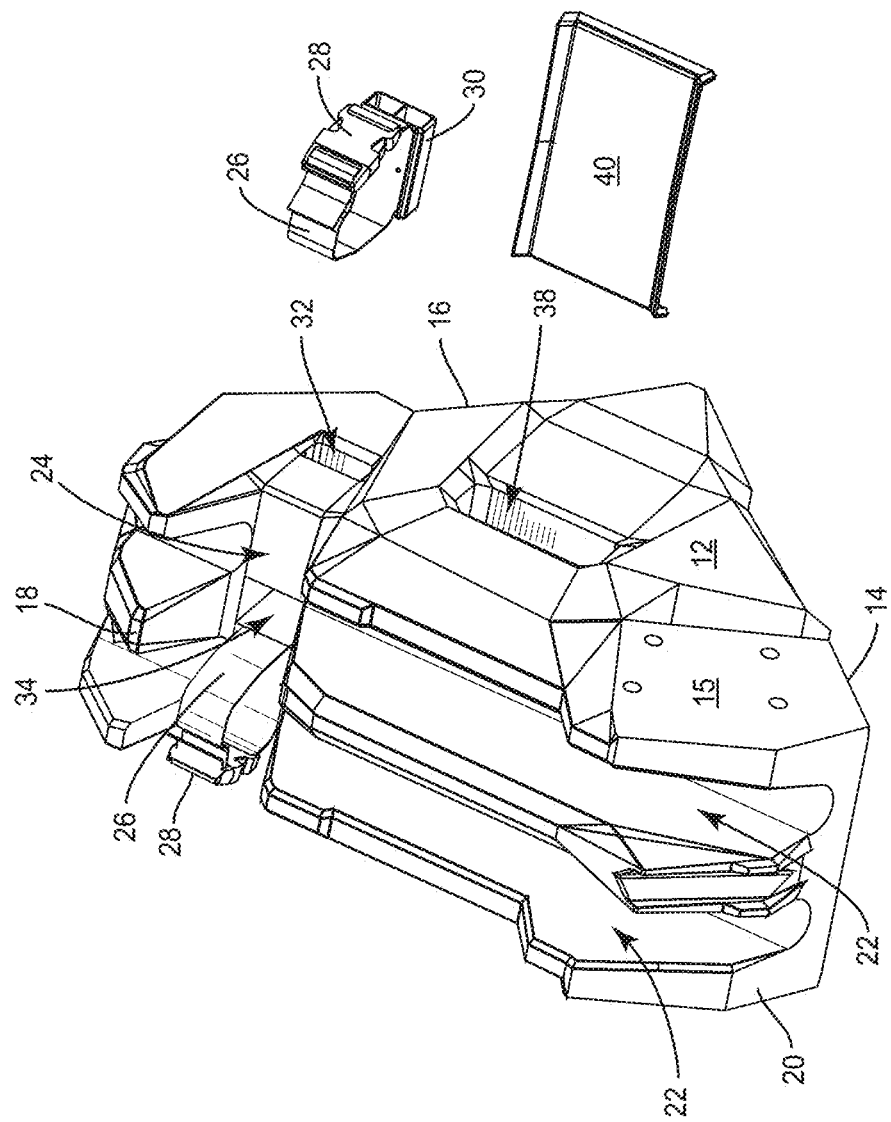
FIG. 4 is an exploded view of the long gun carrier.
Figure 5:
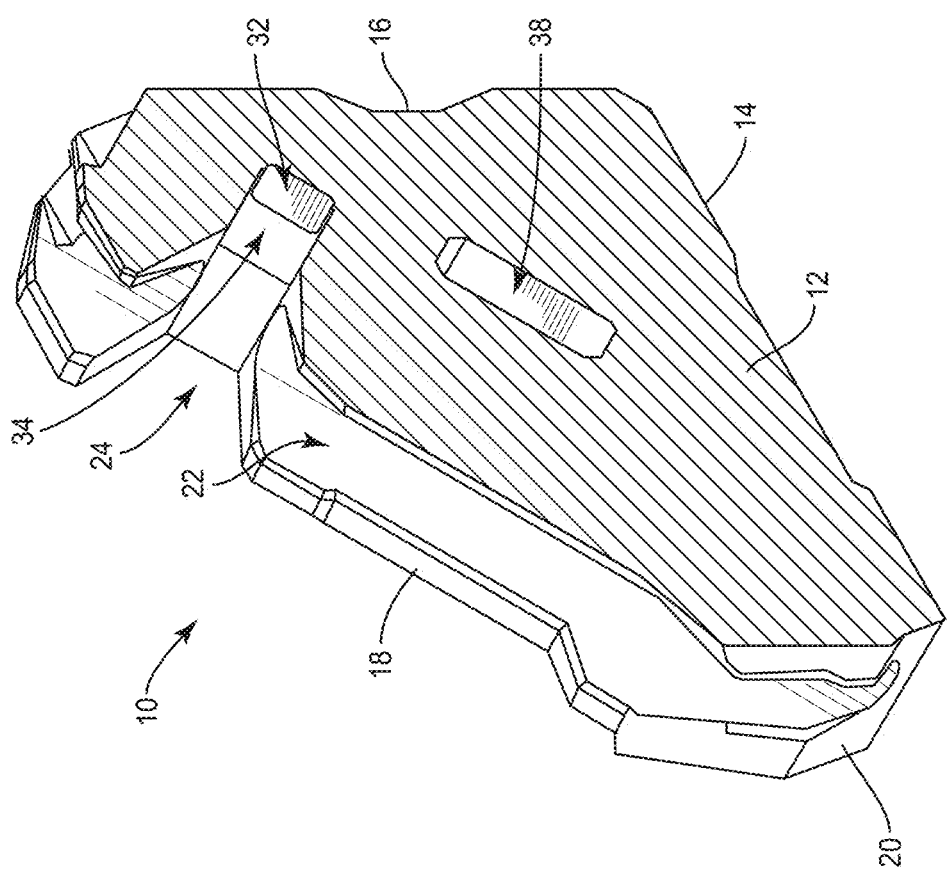
FIG. 5 is a perspective view of the long gun carrier in longitudinal section taken down the center.

As shown in the exploded view in FIG. 4, the strap 26 may be attached to a mounting block 30, which is removably secured in the channel 32. The strap 26 is secured to the mounting block 30 by screws or other suitable fasteners and the mounting block is inserted into the channel 32. The mounting block 30 is sized to frictionally fit in the channel 32. The removable mounting block 30 facilitates replacing straps 26 as they age, tear, or lose elasticity due to wear by removing the mounting block 30 from the chamber, detaching the worn straps 26, and attaching a new strap 26. Securing the strap 26 and fastener 28 to a mounting block 30 also adds modularity to the long gun carrier 10, for example allowing different gun-holding channels 22 to be configured with different length straps 26, to accommodate differently sized or shaped long guns 58.

Figure 6:
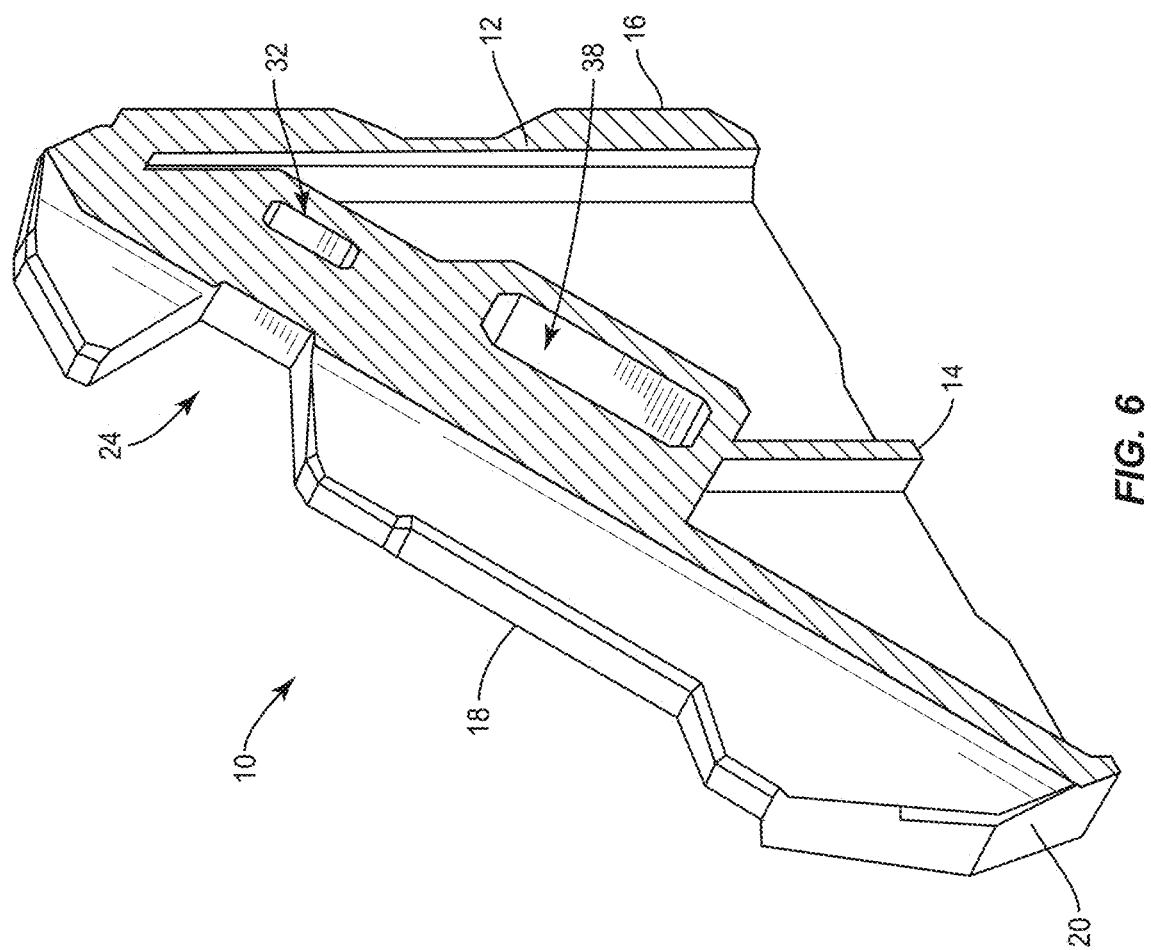
FIG. 6 is a perspective view of one embodiment of the long gun carrier in longitudinal section taken in the center of one gun-holding channel.
Figure 7:
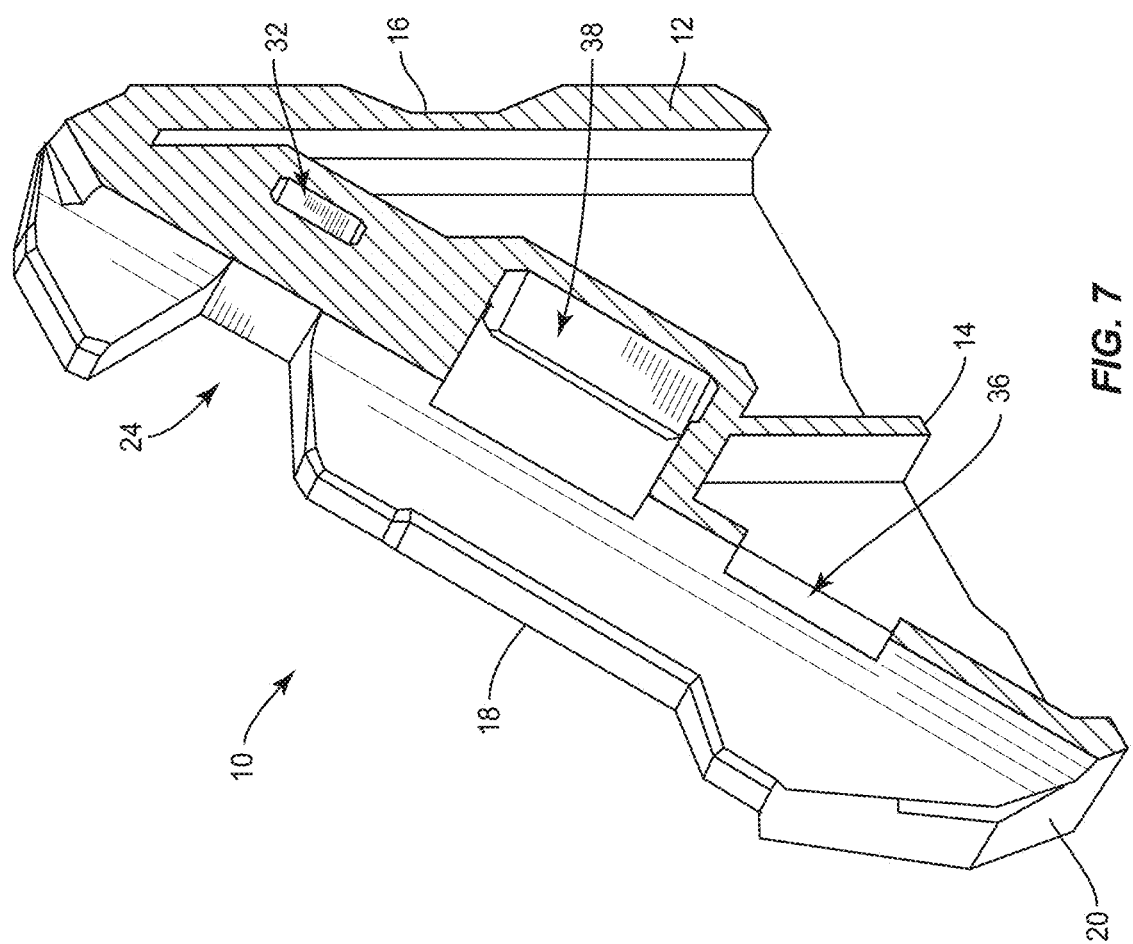
FIG. 7 is a perspective view of another embodiment of the long gun carrier in longitudinal section taken in the center of one gun-holding channel.

FIG. 6 is a longitudinal sectional view of one embodiment, taken down the center of one gun-holding channel 22, showing the chamber 32 extending beneath the gun-holding channel 22, below the cut-out 24. FIG. 7 is a longitudinal sectional view of another embodiment, also taken down the center of one gun-holding channel 22. In this embodiment, a magazine well 36 is formed in the body 12 below the gun-holding channel 22. The magazine well 36 is operative to accept a variety of sizes and shapes of fixed, protruding magazines, or a detachable magazine when it is attached to a long gun 58.

To secure the long gun carrier 10 to a vehicle seat 40, a through-channel 38 extends all the way through the body 12, in a direction traverse to the longitudinal axis 11, below the gun-holding channels 22. In one embodiment, the through-channel 38 is angled similarly to the sloping surface 18. The through-channel 38 is operative to accept a seat belt 56 of the vehicle, to secure the body 12 of the long gun carrier 10 to a vehicle seat 50. In particular, and as depicted in FIG. 3, the seat belt 56, when inserted through the through-channel 38, is operative to secure the long gun carrier 10 such that the bottom surface 14 is secured against the seat portion 52 of the vehicle seat 50 and the back surface 16 is secured against the back portion 54 of the vehicle seat 50. In one embodiment, as depicted in the exploded view of FIG. 4, a detachable load distributor 40 is removably inserted into the through-channel 38. The load distributor 40, which may be made of metal, is positioned between the seat belt and the body 12, and is operative to distribute forces from the seat belt 56 evenly across the through-channel 38.

Figure 8:
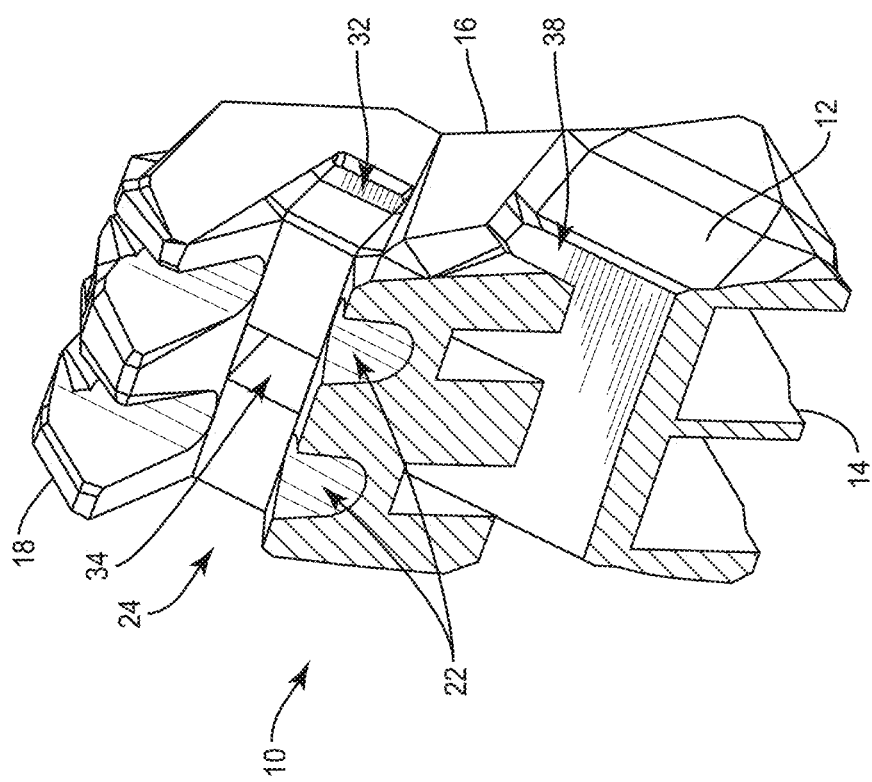
FIG. 8 is a perspective view of the long gun carrier in transverse section.

FIG. 8 is a transverse section view of the long gun carrier 10, particularly showing the formation of gun-holding channels 22 in the sloping surface 18. This view also depicts the through-channel 38, which is large enough to accept a wide variety of seat belts. As depicted in FIGS. 6 and 8, the body 12, beneath the through-channel 38, may have voids formed therein to reduce weight. Hence, the bottom surface 14, while generally flat and horizontal, is not necessarily continuous.

Figure 9:
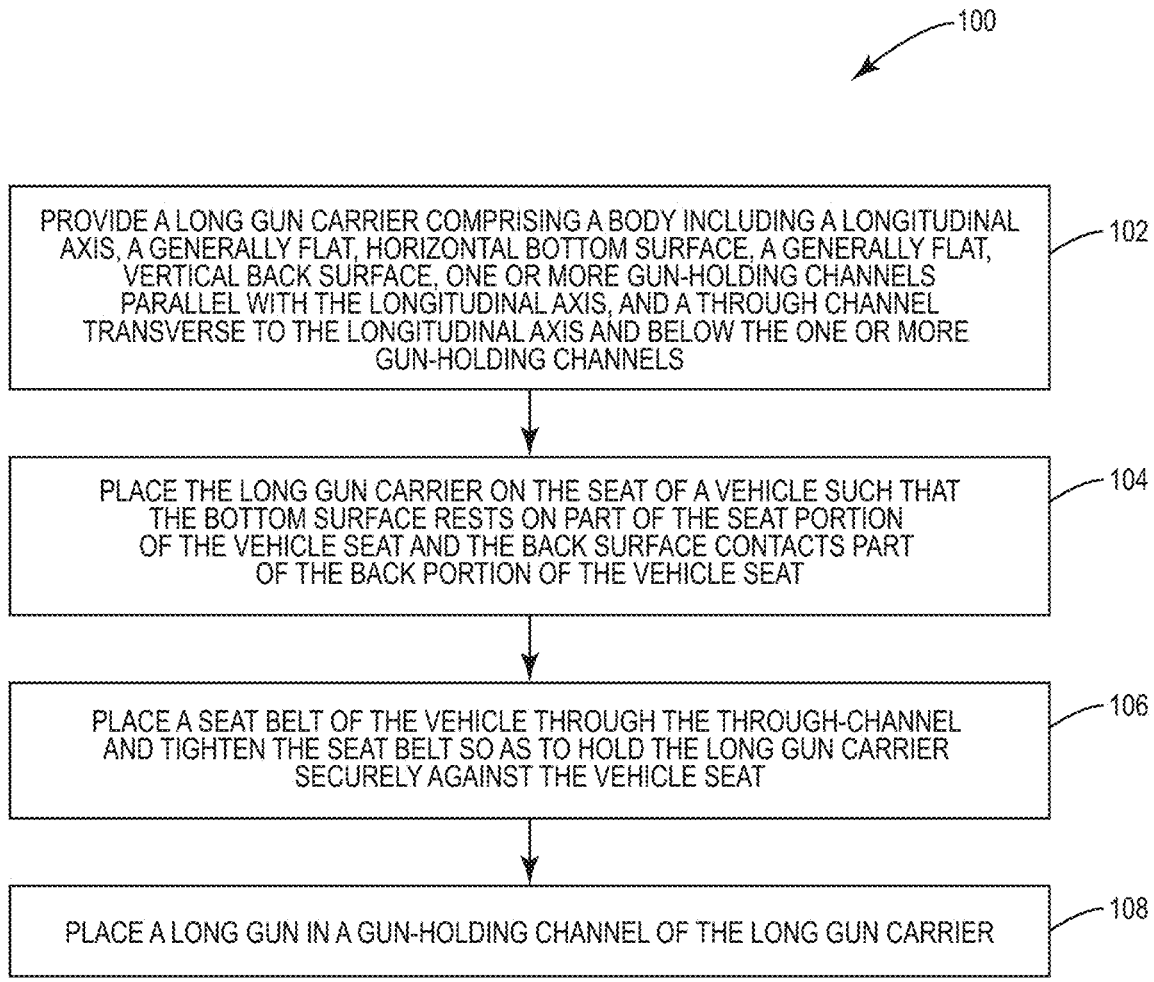
FIG. 9 is a flow diagram of a method of transporting long guns.

FIG. 9 depicts steps in a method 100 of safely and securely transporting long guns 58 in a vehicle having a seat 50 that includes a seat portion 52 and a back portion 54. A long gun carrier 10 is provided (block 102). The long gun carrier 10 comprises a body including a longitudinal axis 11, a generally flat, horizontal bottom surface 14, a generally flat, vertical back surface 16, one or more gun-holding channels 22 parallel with the longitudinal axis 11, and a through-channel 38 transverse to the longitudinal axis 11 and below the one or more gun-holding channels 22. The long gun carrier 10 is placed on the seat 50 of a vehicle such that the bottom surface 14 rests on part of the seat portion 52 of the vehicle seat 50 and the back surface 16 contacts part of the back portion 54 of the vehicle seat 50 (block 104). A seat belt 56 of the vehicle is placed through the through-channel 38 and tightened so as to hold the long gun carrier 10 securely against the vehicle seat 50 (block 106). A long gun 58 is then placed in a gun-holding channel 22 of the long gun carrier 10 (block 108).

Figure 10:
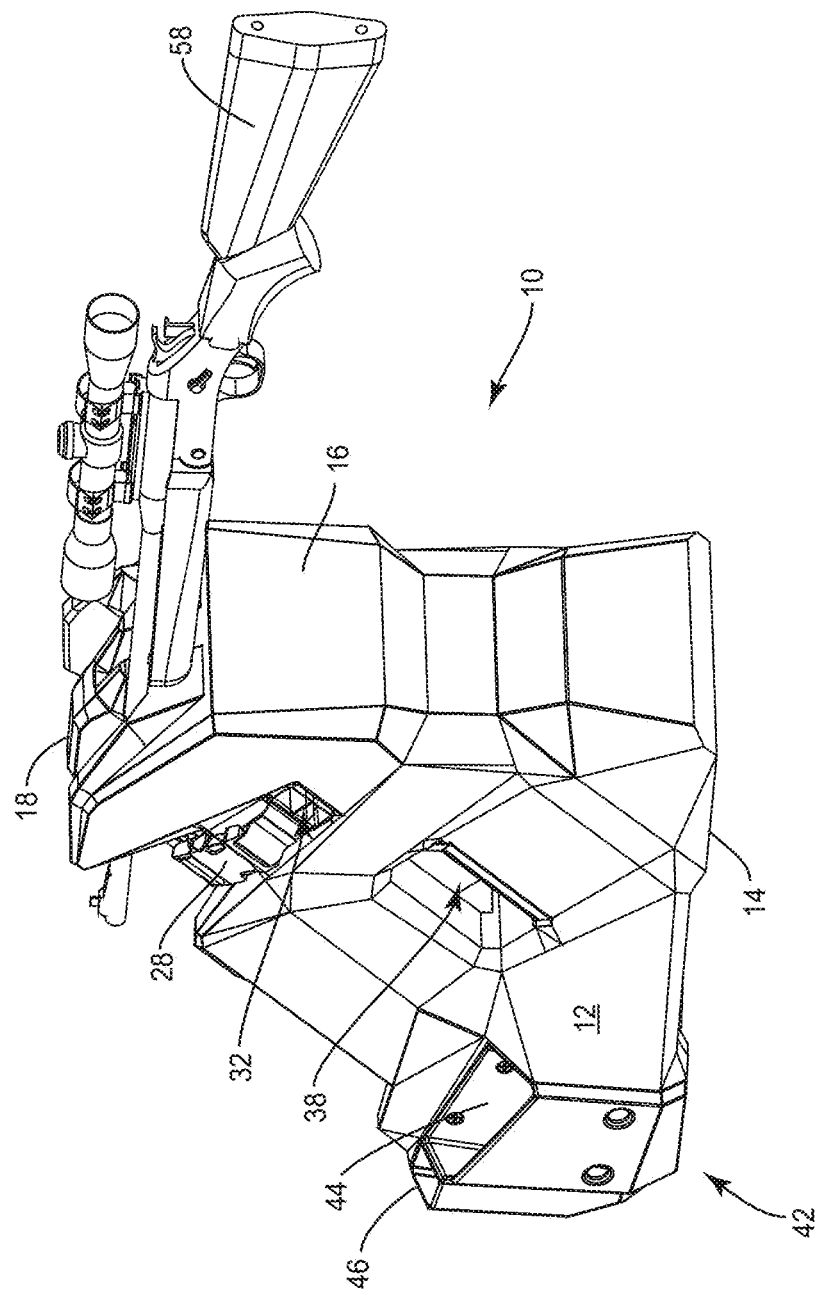
FIG. 10 is perspective view depicting one end of the long gun carrier being used as a shooting rest.

FIG. 10 shows an accessory holder 42 affixed to a generally flat mounting surface 15 formed on the body 12 of the long gun carrier 10. A handgun portion 44 of the accessory holder 42 is sized and shaped to hold a variety of handguns. A magazine portion 46 of the accessory holder 42 is sized and shaped to hold a variety of magazines. In general, a variety of accessory holders 42 may be devised to carry various shooting and hunting accessories, which may be attached to, or formed in, the long gun carrier 10. In one embodiment, the holder 42 is made of rubber or other resilient material and is sized to hold hand guns within a range of sizes. The holder 42 in this embodiment expands when, for example, a handgun is inserted into the holder 42 so that the holder 42 can accommodate handguns of different size and shape.

FIG. 10 also depicts another use of the long gun carrier 10—as a shooting rest for holding a long gun 58 while shooting. In one embodiment, the end of at least one gun-holding channel 22, adjacent the back surface 16, includes a forearm channel formed generally horizontally at the top. The forearm channel is sized and shaped to hold the forearm of a long gun 58. The long gun carrier 10 may be removed from a vehicle, and set up at a gun range, or in the field, to provide stability in shooting the long gun 58, such as for sighting in optics or other sights.

Figure 11:
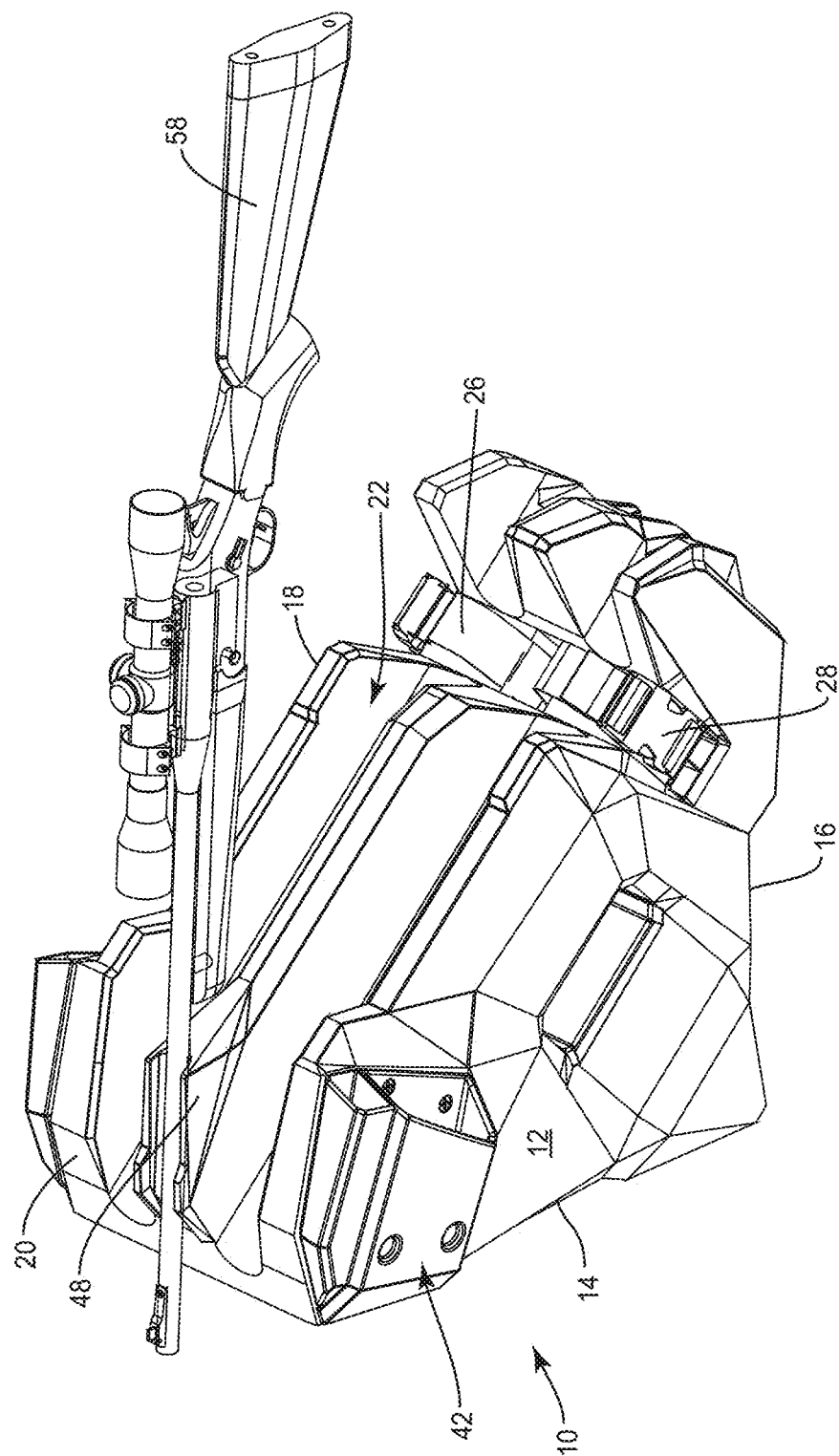
FIG. 11 is perspective view depicting the other end of the long gun carrier being used as a shooting rest.
Figure 12:
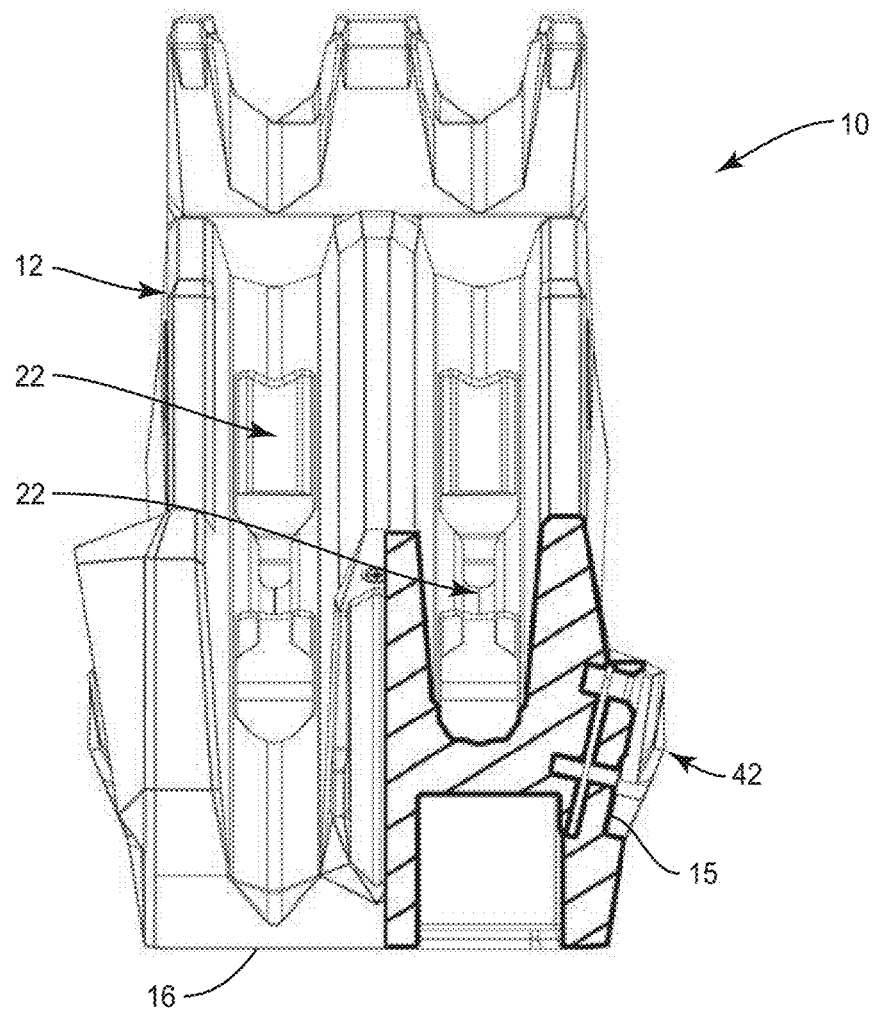
FIG. 12 is a cross section view from the front of a seat carrier according to a second embodiment configured to mount an accessory holder at an angle.

FIG. 11 depicts another use of the long gun carrier 10 as a shooting rest. A barrel channel 48 is formed on or attached to the front surface 20. The barrel channel 48 is sized and shaped to hold the barrel of a long gun 58 while shooting.

Figure 13:
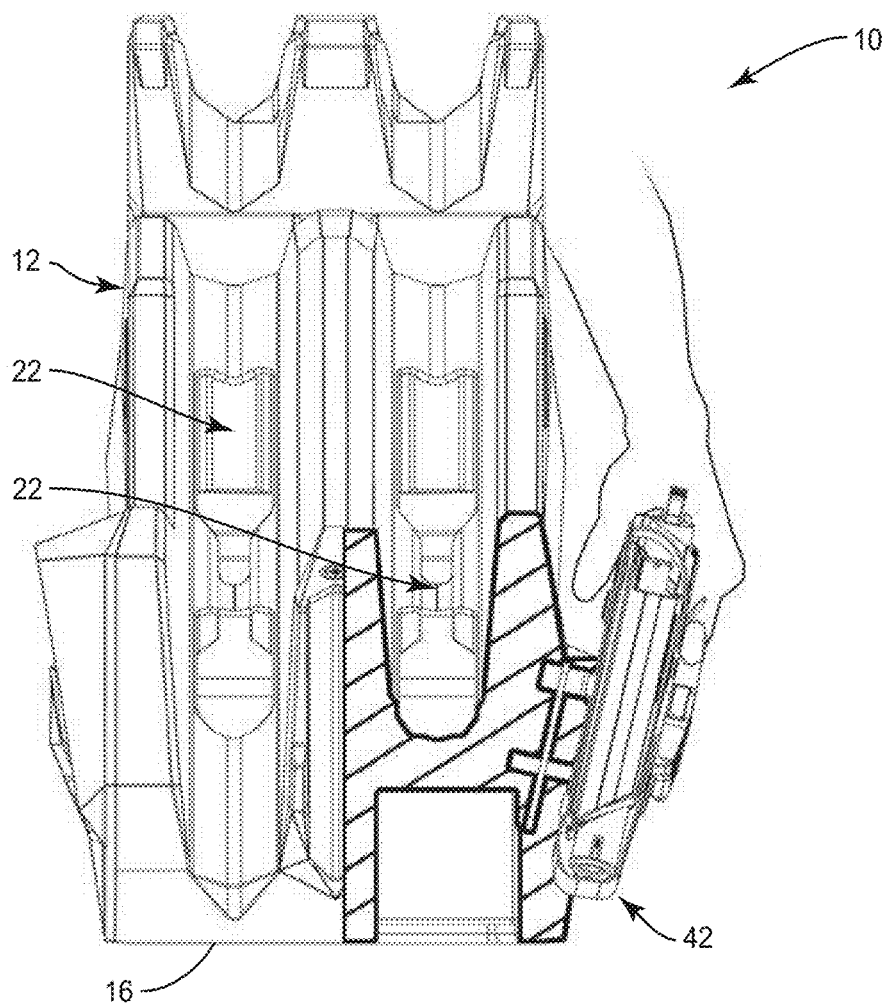
FIG. 13 is a cross section view from the front of a seat carrier according to the second embodiment with a gun in the accessory holder.
Figure 14:
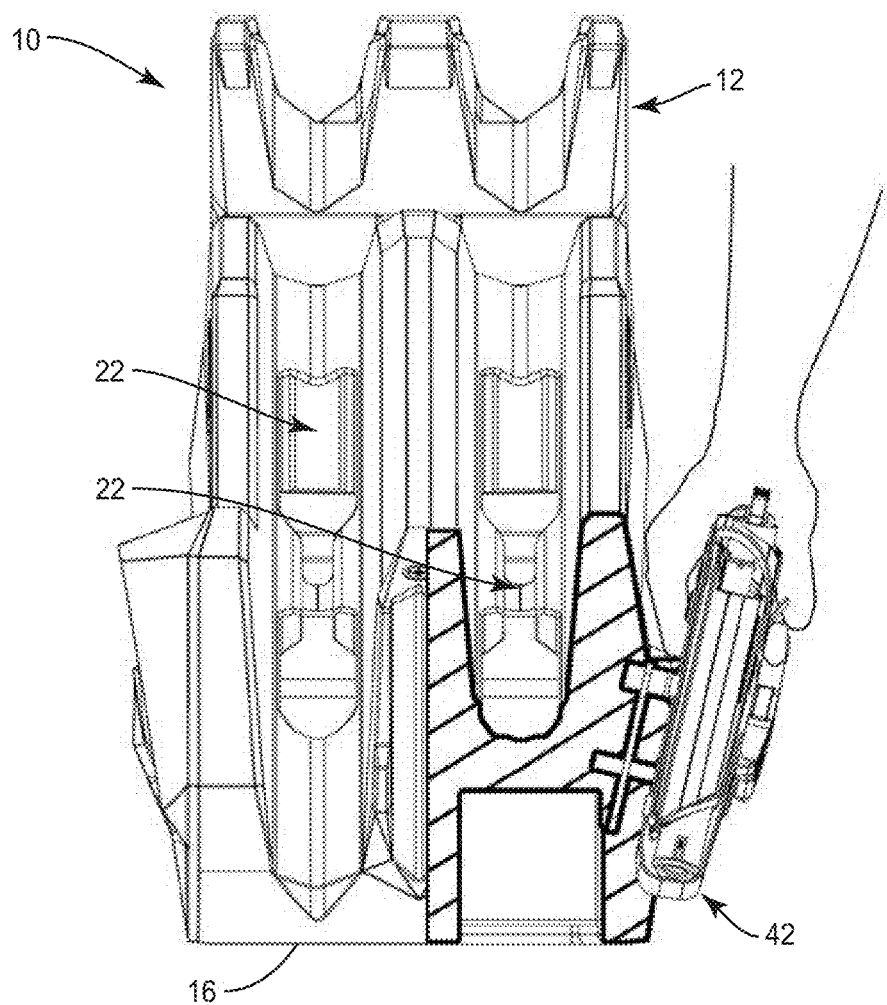
FIG. 14 is a cross section view from the front of a seat carrier according to the second embodiment with a gun in the accessory holder.
Figure 15:
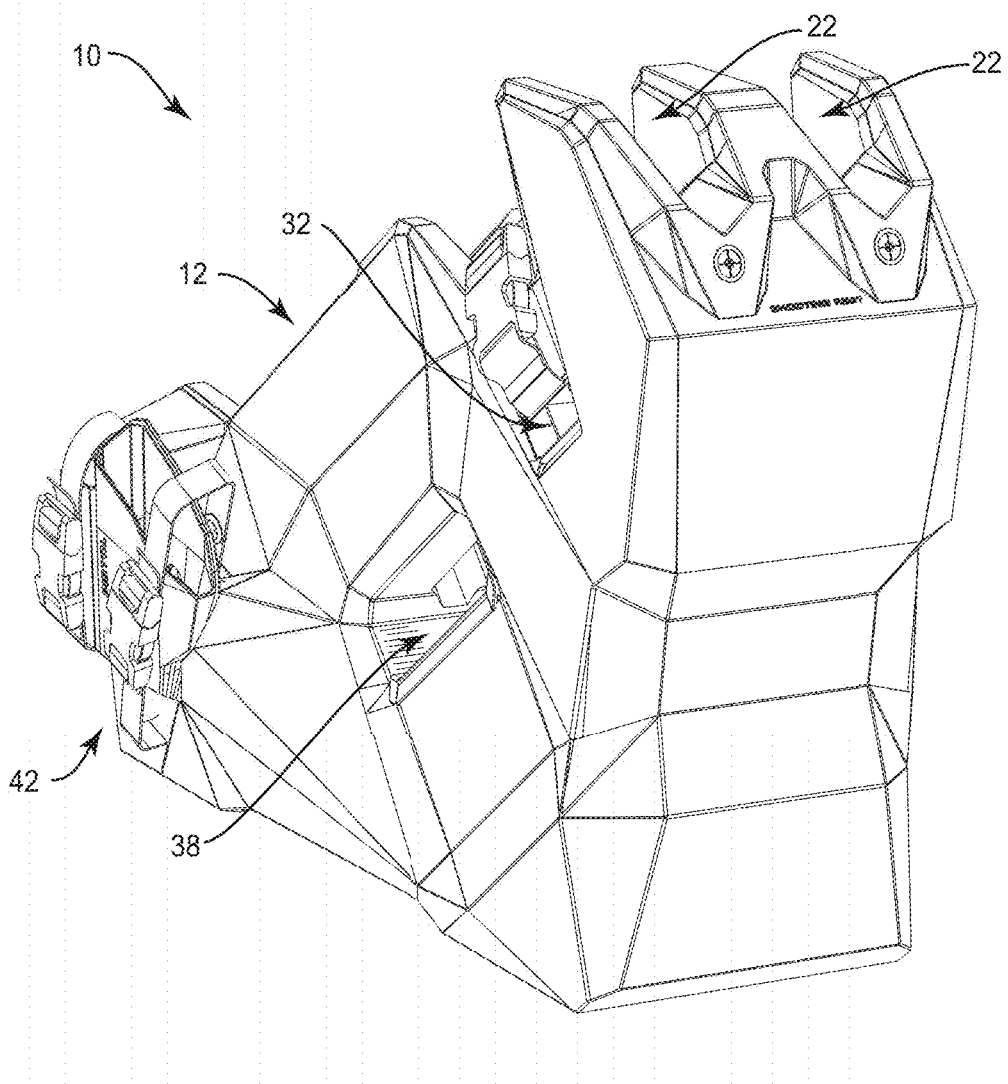
FIG. 15 is a perspective view from the rear of a seat carrier according to the second embodiment with the accessory holder mounted at an angle.
Figure 16:
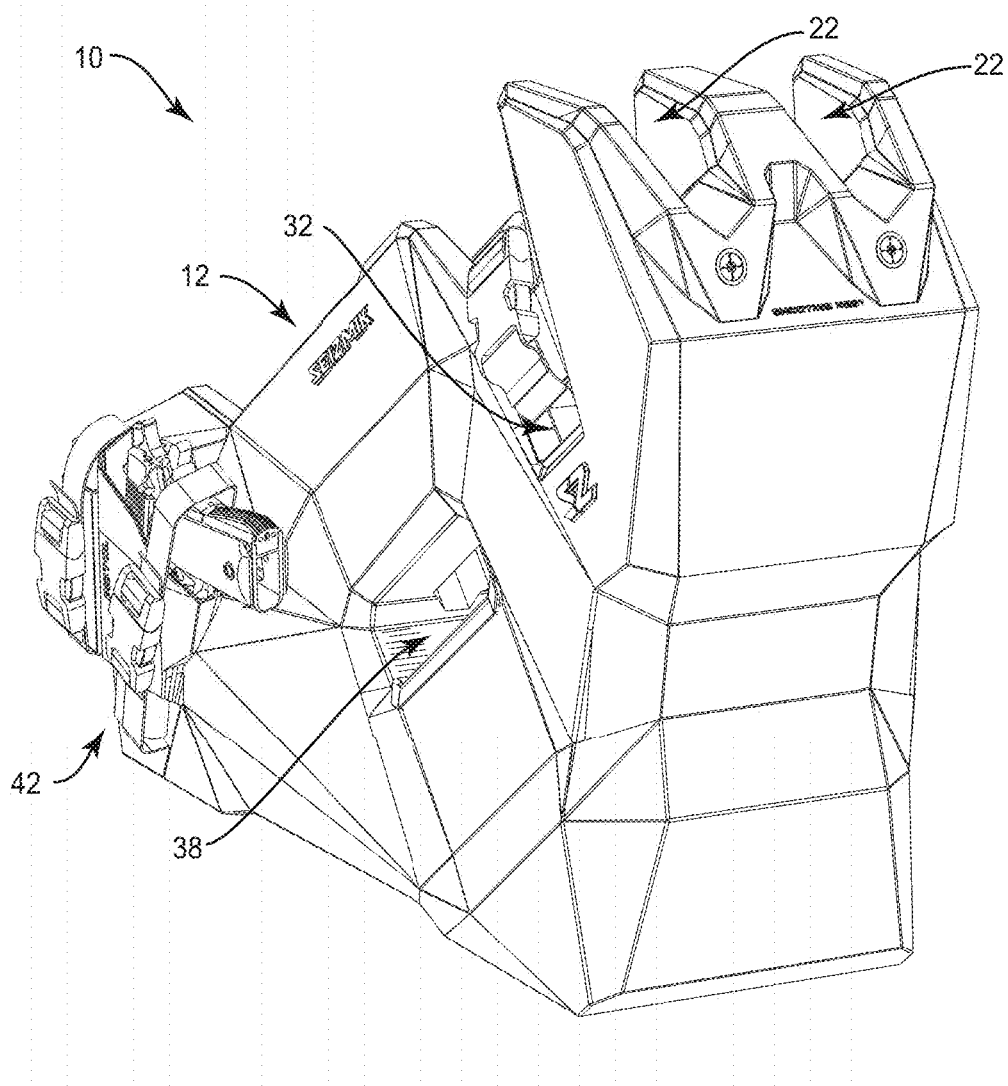
FIG. 16 is a cross section view from the front of a seat carrier according to the second embodiment with a handgun in the accessory holder.

FIGS. 12-16 illustrate an alternate embodiment of the long gun carrier 10 configured to mount the holder 42 at a slight angle. In this embodiment, the mounting surface 15 is angled slightly and the holder 42 extends above the top edge of the mounting surface 15 so that a finger space for the user's hand and/or fingers is created between the holder 42 and the body 12 of the long gun carrier. As shown in FIGS. 13 and 14, the finger space accommodates the user's fingers or thumb when the user is inserting or removing the gun from the gun holder 42 so that the user is able to more comfortably and firmly grip the hand gun as it is being inserted into or removed from the holder 42.

Embodiments of the present invention present numerous advantages over prior art gun racks and holders. The long gun carrier 10 is readily accessible on the seat of a vehicle, and is convenient to access and use. Long guns 58 placed in gun-holding channels 22 travel with the muzzles pointed in a safe direction, towards the floor of the vehicle (and the ground beyond that). The gun-holding channels 22 hold a long gun 58 along a significant portion of its length. Even without strapping a long gun 58 into a gun-holding channel 22, the gun 58 rides securely and is unlikely to become dislodged as the vehicle travels over rough terrain, or in the event of an accident. The long gun carrier 10 requires no modification to the vehicle; its installation and removal is a simple as threading and tightening a seat belt. When installed on a vehicle seat, the long gun carrier 10 carries long guns 58 fairly low, i.e., below the windows in most vehicles. Hence, the long guns 58 are not exposed to exterior view, and do not invite theft. Indeed, the long gun carrier 10 and long guns 58 are easily concealed by placing, e.g., a jacket over them.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A long gun carrier for a vehicle seat that includes a seat portion and a back portion, comprising:
    a bottom adapted to rest on part of the seat portion of the vehicle seat;
    a back adapted to contact part of the back portion of the vehicle seat;
    a slanted top angled relative to both the bottom and the back and extending parallel to a longitudinal axis; the top having first and second gun-holding channels, each gun-holding channel disposed parallel to the longitudinal axis and adapted to removably contain a long gun; wherein the first gun-holding channel comprises a forward portion adapted to cradle an action of the long gun and an aft section adapted to cradle a stock of the long gun, wherein a gap is disposed longitudinally between the forward section and the aft section, wherein the gap is adapted to expose a portion of the long gun between the action and the stock; wherein the gap extends transverse to the longitudinal axis across both the first and second gun-holding channels;
    a first through-channel transverse to the longitudinal axis and disposed below the first and second gun-holding channels, the first through-channel adapted to accept a seat belt operative to secure the carrier to the vehicle seat such that the bottom is secured against the seat portion of the vehicle seat and the back is secured against the back portion of the vehicle seat;
    a second through-channel disposed transverse to the longitudinal axis and below the first and second gun-holding channels and aligned with the gap;
    a spur passage disposed between the first and second gun-holding channels and opening to the gap;
    a magazine recess that is open to the first gun-holding channel, extends downwardly, and is laterally closed; the magazine recess disposed below the first gun-holding channel and closer to a front of the carrier than both the first and second through-channels;
    a strap assembly comprising a strap and an associated fastener; the strap assembly selectively closable into a loop via the fastener to secure the long gun within the first gun-holding channel with the strap assembly looping through the second through-passage, through the spur passage, and across the first gun-holding channel at the gap.

2. The long gun carrier of claim 1, wherein the strap assembly further comprises a mounting block.

3. The long gun carrier of claim 1, further comprising a load distributor positioned within the first through-channel and operative to evenly distribute force from the seat belt.

4. The long gun carrier of claim 1, further comprising an accessory holder mounted to a side of the carrier.

5. The long gun carrier of claim 4, wherein the accessory holder angles upwardly away from the longitudinal axis.

6. The long gun carrier of claim 4, wherein the accessory holder is sized and shaped to removably contain a handgun.

7. The long gun carrier of claim 1, wherein the magazine recess is open-bottomed.

8. The long gun carrier of claim 1, wherein the strap and/or the fastener is adjustable.

9. The long gun carrier of claim 1, wherein the strap is formed of a material having elasticity in at least its longitudinal dimension.

10. A long gun carrier for a vehicle seat that includes a seat portion and a back portion, comprising:
    a bottom adapted to rest on part of the seat portion of the seat;
    a back adapted to contact part of the back portion of the seat;
    a slanted top angled relative to both the bottom and the back and extending parallel to a longitudinal axis; the top having first and second gun-holding channels, each gun-holding channel disposed parallel to the longitudinal axis and adapted to removably contain a long gun; wherein the first gun-holding channel comprises a forward portion adapted to cradle an action of the long gun and an aft section adapted to cradle a stock of the long gun, wherein a gap is disposed longitudinally between the forward section and the aft section, wherein the gap is adapted to expose a portion of the long gun between the action and the stock;
    a first through-channel transverse to the longitudinal axis and disposed below the first and second gun-holding channels, the first through-channel adapted to accept a seat belt to secure the carrier to the vehicle seat such that the bottom is secured against the seat portion of the vehicle seat and the back is secured against the back portion of the vehicle seat;

a second through-channel disposed transverse to the longitudinal axis and below the first and second gun-holding channels and aligned with the gap;

a spur passage disposed between the first and second gun-holding channels and opening to the gap and extending downward to the second through-channel;

a first strap assembly associated with the first gun-holding channel and comprising a first strap and an associated first fastener; the first strap assembly selectively closable into a first loop via the first fastener to secure the long gun within the first gun-holding channel with the first strap assembly looping through the second through-passage, through the spur passage, and across the first gun-holding channel at the gap; and a second strap assembly associated with the second gun-holding channel and comprising a second strap and an associated second fastener; the second strap assembly selectively closable into a loop via the second fastener to secure the long gun within the second gun-holding channel with the second strap assembly looping through the second through-passage, through the spur passage, and across the second gun-holding channel at the gap.

11. The long gun carrier of claim 10, wherein the longitudinal axis is disposed between the first and second gun-holding channels, and wherein the first and second straps, when looped, do not overlap the longitudinal axis.

12. The long gun carrier of claim 10, wherein the first and second gun-holding channels are disposed on opposing sides of the longitudinal axis and are spaced apart sufficiently that no portions of long guns removably contained therein touch each other.

13. The long gun carrier of claim 10, wherein the first strap is secured to a mounting block.

14. The long gun carrier of claim 10, further comprising an accessory holder mounted to a side of the carrier.

15. A method of transporting long guns in a vehicle having a seat belt and a seat that includes a seat portion and a back portion, the method comprising:

providing a long gun carrier comprising:
- a bottom adapted to rest on part of the seat portion of the seat;
- a back adapted to contact part of the back portion of the seat;
- a slanted top angled relative to both the bottom and the back and extending parallel to a longitudinal axis; the top having first and second gun-holding channels, each gun-holding channel disposed parallel to the longitudinal axis and adapted to removably contain a long gun;
- wherein the first gun-holding channel comprises a forward portion adapted to cradle an action of the long gun and an aft section adapted to cradle a stock of the long gun, wherein a gap is disposed longitudinally between the forward section and the aft section, wherein the gap is adapted to expose a portion of the long gun between the action and the stock;
- a first through-channel transverse to the longitudinal axis and disposed below the first and second gun-holding channels, the first through-channel adapted to accept the seat belt to secure the carrier to the vehicle seat;
- a second through-channel disposed transverse to the longitudinal axis and below the first and second gun-holding channels and aligned with the gap;
- a spur passage disposed between the first and second gun-holding channels and opening to the gap;
- a magazine recess that is open to the first gun-holding channel, extends downwardly, and is laterally closed; the magazine recess disposed below the first gun-holding channel and closer to a front of the carrier than both the first and second through-channels;
- a strap assembly comprising a strap and an associated fastener; the strap assembly selectively closable into a loop via the fastener to secure the long gun within the first gun-holding channel with the strap assembly looping through the second through-passage, through the spur passage, and across the first gun-holding channel at the gap;

placing the long gun carrier on the seat of a vehicle such that the bottom surface rests on part of the seat portion of the vehicle seat and the back surface contacts part of the back portion of the vehicle seat;

placing a seat belt of the vehicle through the first through-channel and securing the long gun carrier against the vehicle seat via the seat belt such that the bottom is secured against the seat portion of the vehicle seat and the back is secured against the back portion of the vehicle seat;

placing a long gun in the first gun-holding channel of the long gun carrier such that the action of the long gun is cradled by the forward portion, the stock of the long gun is cradled by the aft section, a portion of the long gun is laterally exposed in the gap, and a magazine of the long gun is received in the magazine recess; and securing the long gun in the first gun-holding channel via the strap assembly.

16. The method of claim 15, further comprising:

removing the long gun from the gun-holding channel of the long gun carrier;

removing the long gun carrier from the vehicle;

orienting the long gun carrier such that a forearm or barrel channel of the long gun carrier is oriented in an aiming direction; and resting a barrel or forearm of the long gun in the forearm or barrel channel to stabilize the long gun while firing it.

17. The method of claim 15, further comprising, after the placing a long gun in the first gun-holding channel, placing a second long gun in the second gun-holding channel.

18. The method of claim 15:

wherein the long gun carrier further comprises an accessory holder mounted to a side of the carrier;

further comprising, after the securing the long gun carrier against the vehicle seat via the seat belt, placing an accessory in the accessory holder.

19. The method of claim 18, wherein the accessory is a handgun.

* * * * *